United States Patent
Yagi (10) Patent No.: US 9,902,308 B2
(45) Date of Patent: Feb. 27, 2018

(54) VEHICLE LIGHTING SYSTEM

(71) Applicant: KOITO MANUFACTURING CO., LTD., Minato-ku, Tokyo (JP)

(72) Inventor: Takayuki Yagi, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 57 days.

(21) Appl. No.: 14/916,116

(22) PCT Filed: Sep. 2, 2014

(86) PCT No.: PCT/JP2014/072980
§ 371 (c)(1),
(2) Date: Mar. 2, 2016

(87) PCT Pub. No.: WO2015/033900
PCT Pub. Date: Mar. 12, 2015

(65) Prior Publication Data
US 2016/0221491 A1    Aug. 4, 2016

(30) Foreign Application Priority Data

Sep. 3, 2013 (JP) .................................. 2013-182444

(51) Int. Cl.
*B60Q 1/16* (2006.01)
*B60Q 1/14* (2006.01)
(Continued)

(52) U.S. Cl.
CPC ........... *B60Q 1/1423* (2013.01); *B60Q 1/143* (2013.01); *B60Q 1/16* (2013.01); *B60Q 1/18* (2013.01);
(Continued)

(58) Field of Classification Search
CPC .......... B60Q 2300/056; B60Q 2300/45; B60Q 2400/50; B60Q 1/143; B60Q 1/1423;
(Continued)

(56) References Cited

U.S. PATENT DOCUMENTS

2004/0114379 A1* 6/2004 Miller .................... B60Q 1/085
362/464
2008/0144326 A1* 6/2008 Watanabe .............. B60Q 1/085
362/466
(Continued)

FOREIGN PATENT DOCUMENTS

DE     103 44 173 A1    4/2005
DE  10 2005 041 234 A1    3/2007
(Continued)

OTHER PUBLICATIONS

Extended European Search Report issued by European Intellectual Property Office dated Apr. 7, 2017 in counterpart European Application No. 14842351.0.
(Continued)

*Primary Examiner* — Anabel Ton
(74) *Attorney, Agent, or Firm* — Sughrue Mion, PLLC (57) ABSTRACT

A vehicle lighting system comprised at least a pair of two-dimensional image forming devices whose shining areas are each divided into a plurality of elements and which are each configured to form an optical image of an arbitrary shape by changing the elements arbitrarily. The shining area of at least one of the two-dimensional image forming devices differs from the shining area of the other of the two-dimensional image forming areas. According to the vehicle lighting system, the light distribution patterns can be formed easily and accurately.

5 Claims, 8 Drawing Sheets (51) Int. Cl.
    *F21S 8/10*      (2006.01)
    *B60Q 1/18*      (2006.01)
    *B60Q 1/34*      (2006.01)

(52) U.S. Cl.
    CPC ............ *B60Q 1/34* (2013.01); *F21S 48/1731* (2013.01); *B60Q 2300/056* (2013.01); *B60Q 2300/45* (2013.01); *B60Q 2400/50* (2013.01); *F21S 48/1757* (2013.01)

(58) Field of Classification Search
    CPC .... B60Q 1/16; B60Q 1/18; B60Q 1/34; F21S 48/1757; F21S 48/1731
    See application file for complete search history.

(56) References Cited

U.S. PATENT DOCUMENTS

| | | |
|---|---|---|
| 2008/0198372 A1 | 8/2008 | Pan |
| 2008/0239746 A1 | 10/2008 | Wuller et al. |
| 2009/0046474 A1 | 2/2009 | Sato et al. |
| 2009/0290372 A1 | 11/2009 | Kotajima et al. |
| 2012/0044090 A1 | 2/2012 | Kahler et al. |
| 2014/0029281 A1* | 1/2014 | Suckling .................. F21V 9/16 362/510 |
| 2015/0211703 A1* | 7/2015 | Nakazawa .......... F21S 48/1757 362/514 |

FOREIGN PATENT DOCUMENTS

| | | |
|---|---|---|
| DE | 10 2009 021 046 A1 | 12/2009 |
| DE | 10 2010 034 853 A1 | 2/2012 |
| JP | 2003-231450 A | 8/2003 |
| JP | 2008-143510 A | 6/2008 |
| JP | 2013-73691 A | 4/2013 |

OTHER PUBLICATIONS

International Search Report dated Oct. 7, 2014 issued by the International Searching Authority in counterpart International Application No. PCT/JP2014/072980 (PCT/ISA/210/220).

Written Opinion dated Oct. 7, 2014 issued by the International Searching Authority in counterpart International Application No. PCT/JP2014/072980 (PCT/ISA/237).

* cited by examiner

VEHICLE LIGHTING SYSTEM

TECHNICAL FIELD

The present invention relates to a vehicle lighting system.

BACKGROUND ART

There are known vehicle lamps which can emit a spot beam in addition to a low beam so as to improve the visibility of a driver of a subject vehicle while controlling the glare to an oncoming vehicle (refer to, for example, Patent Document 1).

A vehicle lamp like this incorporates spot beam shining lamp units which employ a liquid crystal shade. These spot beam shining lamp units are disposed at right- and left-hand sides of a vehicle. A desired spot light distribution pattern is formed by superposing one on the other optical images which are projected from the spot beam shining lamp units disposed at the right- and left-hand sides of the vehicle.

PRIOR ART DOCUMENTS

Patent Documents

Patent Document 1: JP-A-2013-73691

SUMMARY OF THE INVENTION

Problems to be Solved by the Invention

In the vehicle lamp described above, however, the optical images projected from the spot beam shining lamp units which are disposed at the right- and left-hand sides of the vehicle are superposed on each other, and therefore, optical axes of the spot beam shining lamp units need to be aligned precisely and accurately. Alternatively, it is difficult to superpose the optical images of the spot beam shining lamp units on each other when the vehicle turns. This makes it difficult to form various light distribution patterns such as spot light distribution patterns accurately.

Then, an object of the present invention is to provide a vehicle lighting system which can form light distribution patterns easily and accurately.

Means for Solving the Problem

According to the present invention, there is provided a vehicle lighting system having at least a pair of two-dimensional image forming devices whose shining areas are each divided into a plurality of elements and which are each configured to form an optical image of an arbitrary shape by changing the elements arbitrarily, wherein the shining area of at least one of the two-dimensional image forming devices differs from the shining area of the other of the two-dimensional image forming areas.

In the present invention described above, the optical image formed by the one two-dimensional image forming device may be used for a different application from an application of the optical image formed by the other two-dimensional image forming device.

In the present invention described above, the pair of two-dimensional image forming devices may be provided individually at a left-hand side and a right-hand side of a vehicle.

In the present invention described above, the shining area of the one two-dimensional image forming device may be positioned above the shining area of the other two-dimensional image forming device.

In the present invention described above, the shining area of the one two-dimensional image forming device may be wider than the shining area of the other two-dimensional image forming device.

Advantage of the Invention

According to the vehicle lighting system of the present invention, the light distribution patterns can be formed easily and accurately.

MODES FOR CARRYING OUT THE INVENTION

<Overall Configuration>

Hereinafter, a vehicle lighting system according to an embodiment of the present invention will be described in detail by reference to the drawings.

Figure 1:
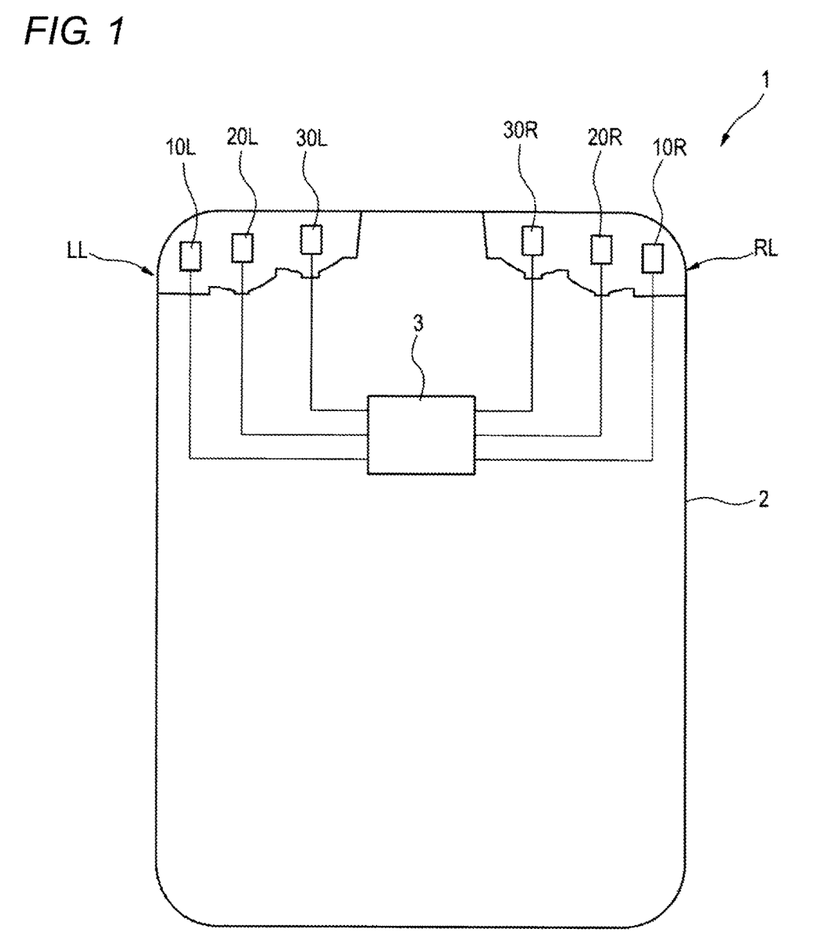
FIG. 1 is a schematic diagram of a vehicle lighting system according to an embodiment.

FIG. 1 is a schematic diagram of a vehicle lighting system 1 according to this embodiment. The vehicle lighting system 1 is used to enhance the visibility and convenience of a driver (a user) by forming optical images around a vehicle 2.

As shown in FIG. 1, the vehicle lighting system 1 includes a left lamp LL which is provided at a left-hand side of a vehicle front portion, a right lamp RL which is provided at a right-hand side of the vehicle front portion, and an ECU (Electronic Control Unit) 3 which controls these lamps LL, RL.

The left lamp LL includes a left image forming device 10L (an example of one of two-dimensional image forming devices), a left low beam shining lamp 20L and a left high beam shining lamp 30L in an interior of a lamp compartment thereof.

The right lamp RL includes a right image forming device 10R (an example of the other of the two-dimensional image forming devices), a right low beam shining lamp 20R and a right high beam shining lamp 30R in an interior of a lamp compartment thereof.

Figure 2:
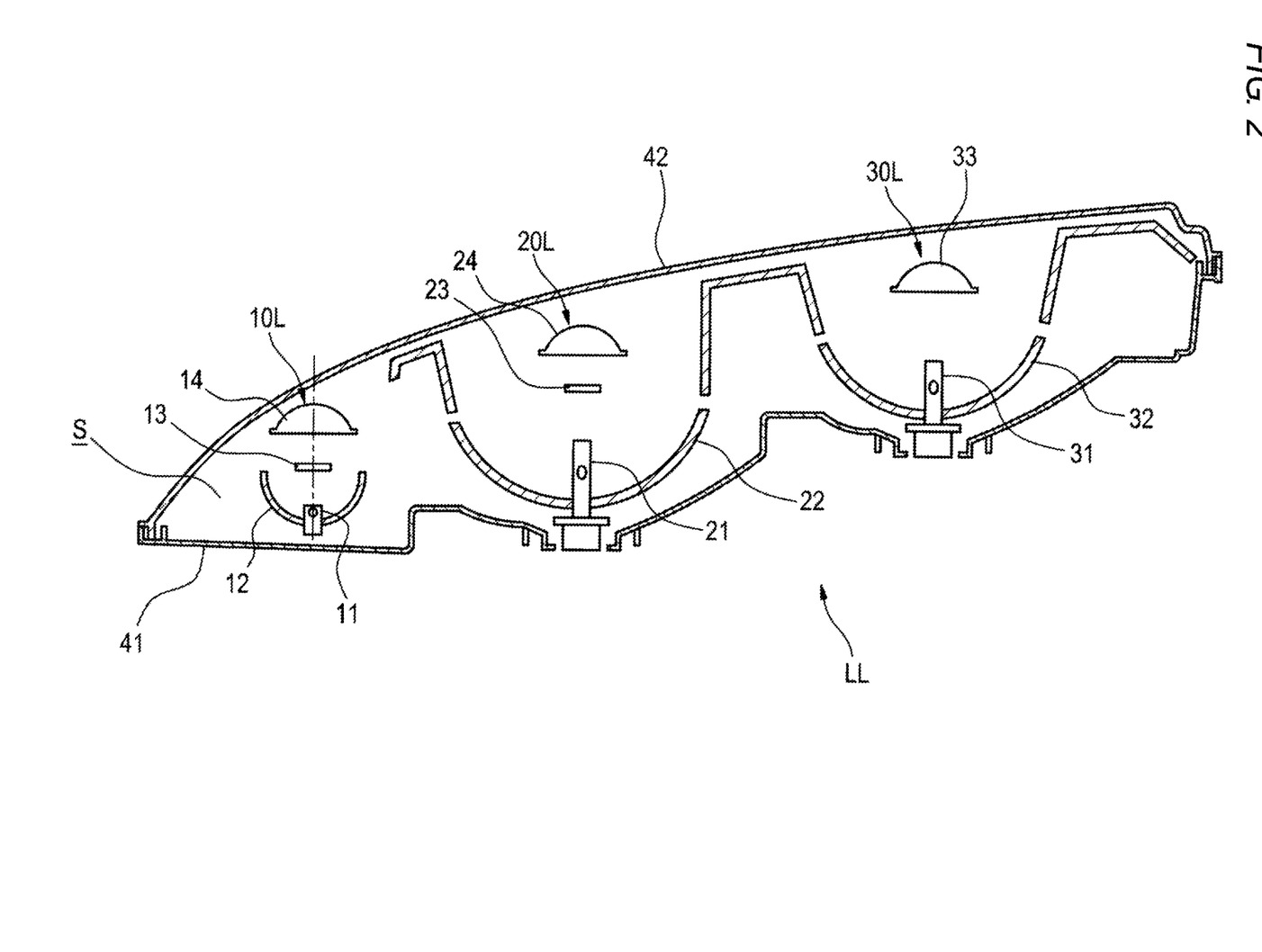
FIG. 2 is a side sectional view of a left lamp.

FIG. 2 is a side sectional view of the left lamp LL. The configuration of the left lamp LL will be described by employing FIG. 2. The configuration of the right lamp RL is similar to that of the left lamp LL, and therefore, the description of the right lamp RL will be omitted here.

As shown in FIG. 2, the left lamp LL includes a housing 41 which is opened to the front and an outer lens 42 which closes an opening of the housing 41. The outer lens 42 is a transparent member and defines the lamp compartment S between the housing 41 and itself.

The left image forming device 10L, the left low beam shining lamp 20L and the left high beam shining device 30L are provided in the interior of the lamp compartment S.

(Low Bean Shining Lamp)

The left low beam shining lamp 20L is lit to illuminate a near front area of the subject vehicle when the subject vehicle and an oncoming vehicle pass each other at night. Thus, the left low beam shining lamp 20L is a lamp which can shine a so-called low beam light distribution pattern.

A know lamp unit can be used for the left low beam shining lamp 20L. Specifically, the left low beam shining lamp 20L includes a light source 21, a reflector 22, a shade 23 and a projection lens 24.

The reflector 22 reflects light emitted from the light source 21 to the front so as to be incident on the projection lens 24, and the projection lens 24 projects the light to the front of the vehicle 2. The shade 23 cuts off part of the light which is incident on the projection lens 24 to thereby form a cut-off line. This enables the left low beam shining lamp 20L to form a low beam light distribution pattern in which light is prevented from being shone to an upper side of the cut-off line. Thus, the low beam light distribution pattern is suitable for a light distribution pattern to be formed when the subject vehicle and an oncoming vehicle pass each other.

(High Beam Shining Lamp)

The left high beam shining lamp 30L is lit to illuminate a far front area of the subject vehicle while the subject vehicle is driven normally at night. Thus, the left high beam shining lamp 30L is a lamp which can shine a so-called high beam light distribution pattern.

A know lamp unit can be used for the left high beam shining lamp 30L. Specifically, the left high beam shining lamp 30L includes a light source 31, a reflector 32, and a projection lens 33. The reflector 32 reflects light emitted from the light source 31 to the front so as to be incident on the projection lens 33. The projection lens 33 projects the light obliquely upwards and forwards of the lamp. This enables the left high beam shining lamp 30L to form a high beam light distribution pattern which provides high visibility suitable for a case when the subject vehicle is driven normally at night.

(Image Forming Device)

The left image forming device 10L includes a light source 11, a reflector 12 which is provided at the rear of the light source 11, an image forming module 13 which is provided further forwards than the reflector 12, and a projection lens 14 which is provided further forwards than the image forming module 13. In the left image forming device 10, an arbitrary image formed by the image forming module 13 is projected to the front of the vehicle by the projection lens 14.

The reflector 12 reflects light emitted from the light source 11 towards the image forming module 13. The projection lens 14 shines the light transmitted through the image forming module 13 towards the front of the vehicle.

The projection lens 14 is a planoconvex aspheric lens in which a front surface is convex and a rear surface is plane. The projection lens 14 projects an image which is formed on a rear focal plane which includes a rear focal point thereof to the front of the lamp as an inverted image.

Figure 3A:
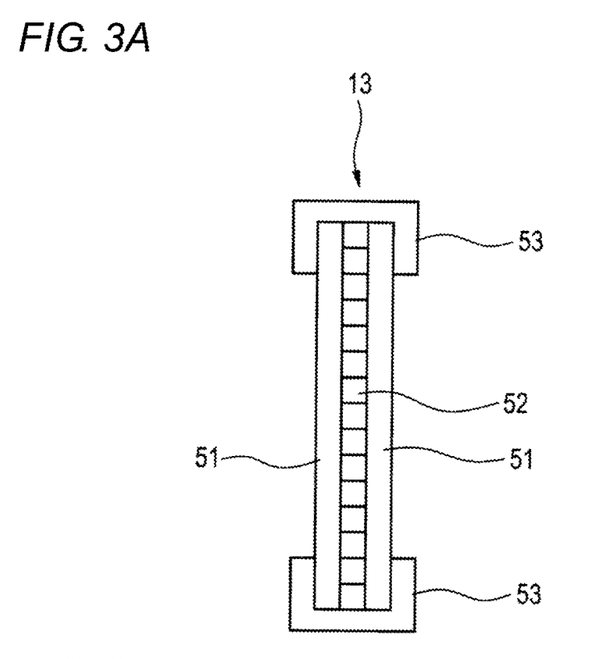
FIG. 3A is a side sectional view depicting a liquid crystal image forming module.
Figure 3B:
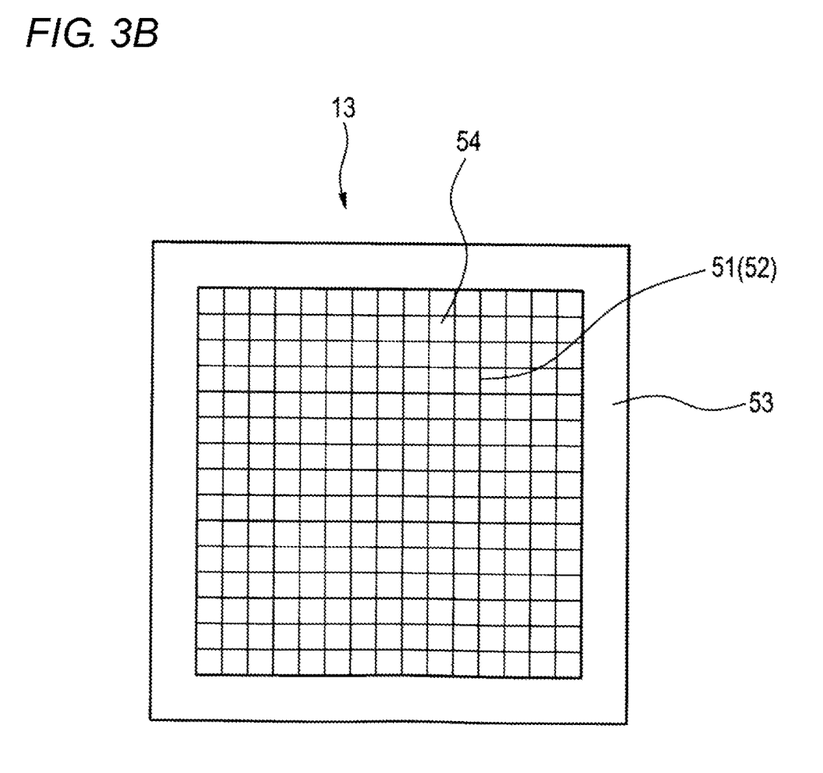
FIG. 3B is a front view depicting the liquid crystal image forming module.

FIG. 3A is a side sectional view depicting the image forming module 13 and FIG. 3B is a front view depicting the image forming module 13.

As shown in FIG. 3A, the image forming module 13 includes a pair of glass plates 51. The glass plates 51 are provided so that a normal line thereto coincides with an optical axis of the projection lens 14. A plurality of liquid crystal elements 52 are sealed in between the pair of glass plates 51. Outer circumferential sides of the glass plates 51 are supported by a frame 53.

As shown in FIG. 3B, the plurality of liquid crystal elements 52 are arranged into a matrix configuration, and an image forming plane 54 is formed by the plurality of liquid crystal elements 52. The individual liquid crystal elements 52 can be controlled independently, and the liquid crystal elements 52 can be switched between a state (an ON state) in which light is transmitted through each liquid crystal element 52 from the rear to the front thereof and a state (an OFF state) in which no light is transmitted through each liquid crystal element 52. An arbitrary image can be formed on the image forming plane 54 by putting only the specific liquid crystal elements 52 into the ON state.

The rear focal point of the projection lens 14 is positioned near the image forming plane 54 which is made up of the liquid crystal elements 52. An image formed on the image forming plate 54 is inverted and is then projected to the front of the lamp as a light source image by the projection lens 14.

<Light Distribution Patterns Formed by the Vehicle>

Figure 4:
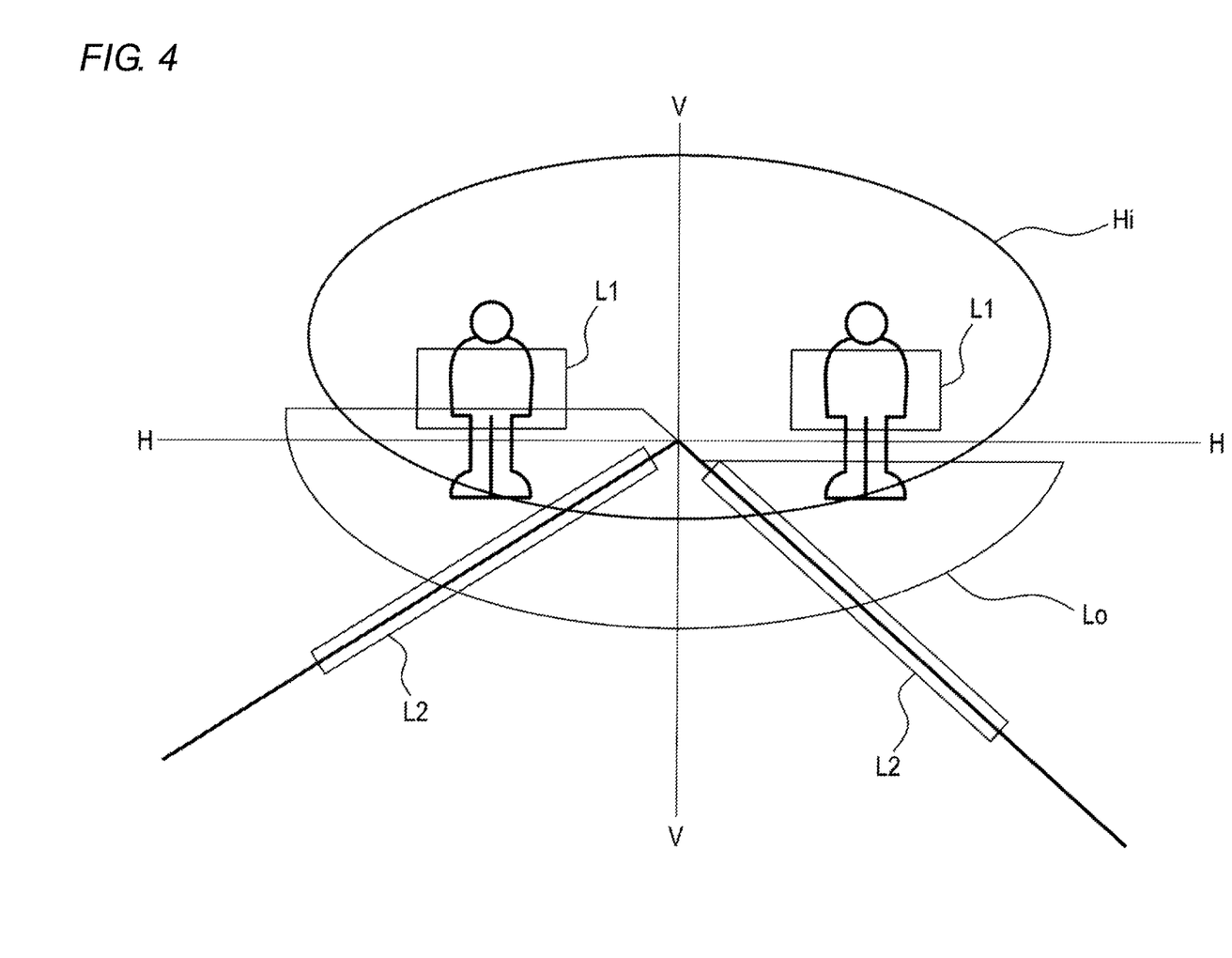
FIG. 4 is a schematic diagram of light distribution patterns formed by the vehicle lighting system.

FIG. 4 is a schematic diagram depicting light distribution patterns formed by the vehicle lighting system 1 configured as has been described heretofore. FIG. 4 shows the light distribution patterns formed to the front of the vehicle and seen from the driver.

In the vehicle lighting system 1 according to this embodiment, as shown in FIG. 4, a low beam light distribution pattern Lo, a high beam light distribution pattern Hi, pedestrian illuminating patterns L1 for illuminating a pedestrian, and lane forming patterns L2 for drawing or defining a driving lane on a road surface are shone to the front of the lamps.

The low bean light distribution pattern Lo includes a cut-off line which extends horizontally. The low beam light distribution pattern Lo is formed by superposing an optical image formed by the left low beam shining lamp 20L and an optical image formed by the right low beam shining lamp 20R on each other at an area lying ahead of the lamps.

The high beam light distribution pattern Hi is formed above the low beam light distribution pattern Lo. The high beam light distribution pattern Hi is formed by superposing an optical image formed by the left high beam shining lamp 30L and an optical image formed by the right high beam shining lamp 30R on each other at an area lying ahead of the lamps.

(Pedestrian Illuminating Pattern)

Figure 5A:
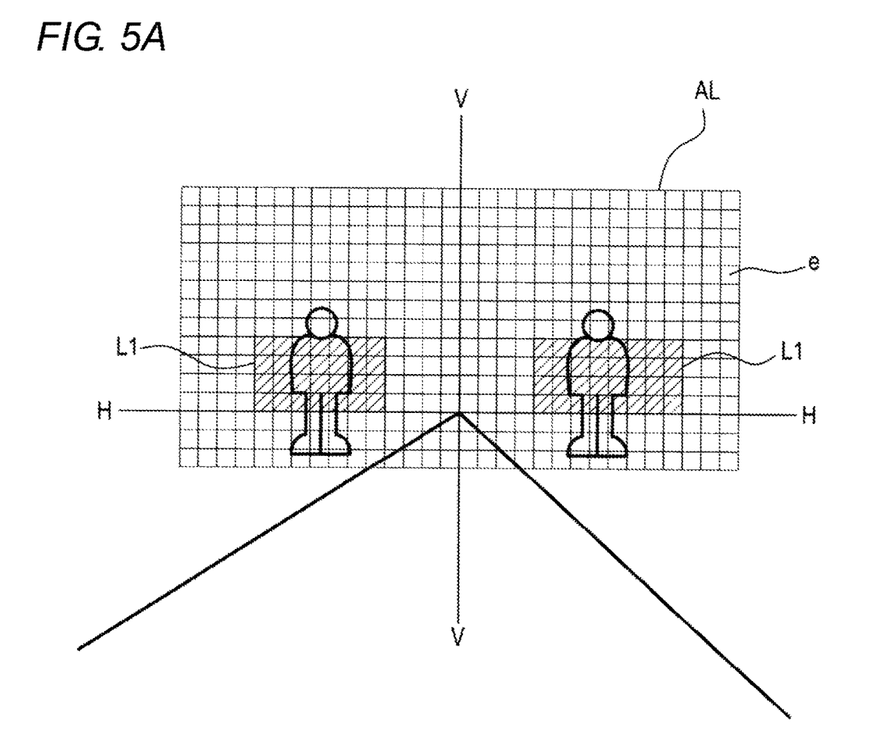
FIGS. 5A and 5B show diagrams depicting a pedestrian illuminating pattern.

Next, the pedestrian illuminating patterns L1 will be described with reference to FIGS. 5A and 5B. FIG. 5A shows a diagram depicting only the pedestrian illuminating patterns L1 as if only the pedestrian illuminating patterns L1 are taken out of FIG. 4.

The pedestrian illuminating patterns L1 are a light distribution pattern shone towards a pedestrian. These pedestrian illuminating patterns L1 are formed only by the left image forming device 10L. For example, when the ECU 3 receives information from a pedestrian detection sensor, the ECU 3 sends a command to the left image forming device 10L so that light is shone on to the pedestrian or pedestrians sensed by the pedestrian detection sensor.

Figure 5B:
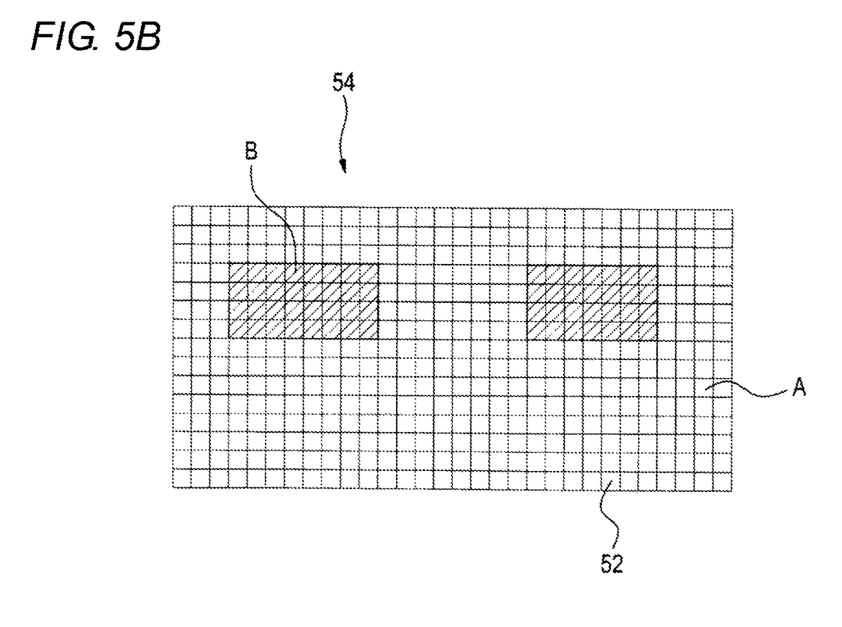

FIG. 5B is a front view of the image forming plane 54 of the left image forming device 10L when the pedestrian illuminating patterns L1 shown in FIG. 5A are shone.

In the left image forming device 10L, a shining area AL of the left image forming device 10L is divided into a plurality of elements e, and the specific liquid crystal elements 52 are put in the ON state, whereby specific elements e of the elements e which make up the shining area AL can be illuminated. In FIG. 5A, the shining area AL and the individual elements e are shown imaginarily. It is noted that the shining area AL is divided into more elements e than those depicted in FIGS. 5A and 5B in reality.

Light beams which pass through the liquid crystal elements 52 of the image forming module 13 of the left image forming device 10L illuminate individually the corresponding elements e. The states of the individual elements e can be changed by switching the ON/OFF states of the individual liquid crystal elements 52, whereby a pedestrian illuminating pattern (an optical image) L1 of an arbitrary shape can be formed at an arbitrary location within the shining area AL.

In FIG. 5B, with the liquid crystal elements 52 which belong to a non-hatched area A in the shining area AL put in the OFF state and the liquid crystal elements belonging to hatched areas B put in the ON state, the pedestrian illuminating patterns L1 shown in FIG. 5A can be formed. In case all the liquid crystal elements 52 of the left image forming device 10L are put in the ON state, light from the light source can be shone onto the whole of the shining area AL of the left image forming device 10L.

(Lane Forming Patterns)

Figure 6A:
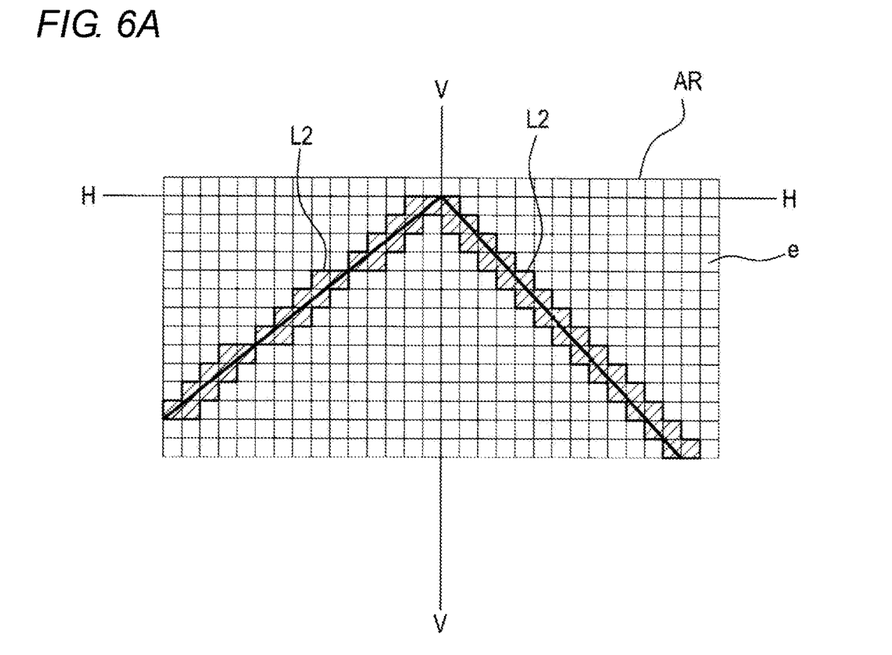
FIGS. 6A and 6B show diagrams depicting a lane forming pattern.

Next, the lane forming patterns L2 will be described with reference to FIGS. 6A and 6B. FIG. 6A shows a diagram depicting only the lane forming patterns L2 as if only the lane forming patterns L2 are taken out of FIG. 4.

With the lane forming patterns L2, a driving lane for the subject vehicle is drawn or defined on a road surface to support the driver in driving. These lane forming patterns L2 are formed by the right image forming device 10R.

The ECU 3 sends a command to the right image forming device 10R so as to draw or define a driving lane on the road surface according to the conditions of the road surface or information on whether the road on which the subject vehicle is travelling will be a straight path or a curved path which is obtained from a navigation system.

Figure 6B:
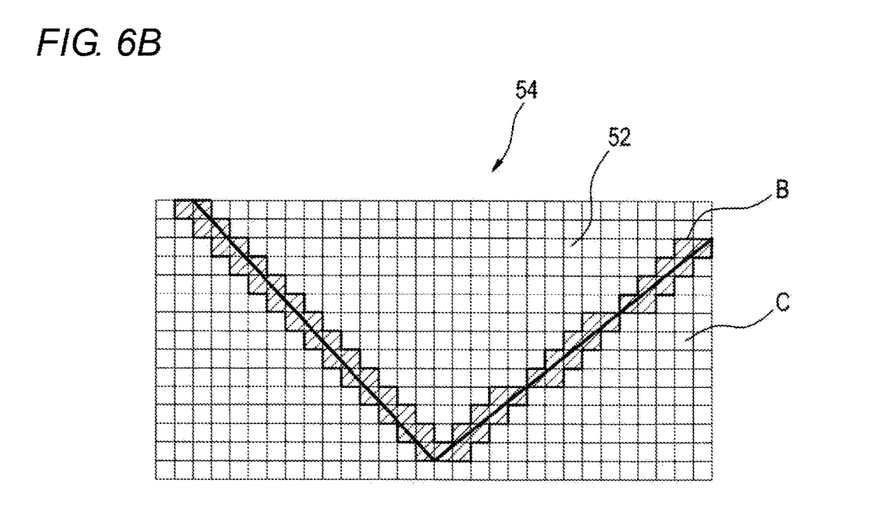

FIG. 6B is a front view depicting an image forming plane 54 of the right image forming device 10R when the lane forming patterns L2 shown in FIG. 6A are shone.

As in the case with the left image forming device 10L, in the right image forming device 10R, too, a shining area AR of the right image forming device 10R is divided into a plurality of elements e, and specific liquid crystal elements 52 of the image forming plane 54 are put in the ON state, whereby a specific element e which configures the shining area AR can be illuminated. In FIG. 6A, the shining area AR and the individual elements e are shown imaginarily. It is noted that the shining area AR is divided into more elements e than those depicted in FIGS. 6A and 6B in reality.

Light beams which pass through the liquid crystal elements 52 of an image forming module 13 of the right image forming device 10R illuminate individually the corresponding elements e. The states of the individual elements e can be changed by switching the ON/OFF states of the individual liquid crystal elements 52, whereby a lane forming pattern (an optical image) L2 of an arbitrary shape can be formed at an arbitrary location within the shining area AR.

In FIG. 6B, with the liquid crystal elements 52 which belong to a non-hatched area C in the shining area AR put in the OFF state and the liquid crystal elements belonging to hatched areas B put in the ON state, the lane forming patterns L2 shown in FIG. 6A can be formed. In case all the liquid crystal elements 52 of the right image forming device 10R are put in the ON state, light from the light source can be shone onto the whole of the shining area AR of the right image forming device 10R.

Figure 7:
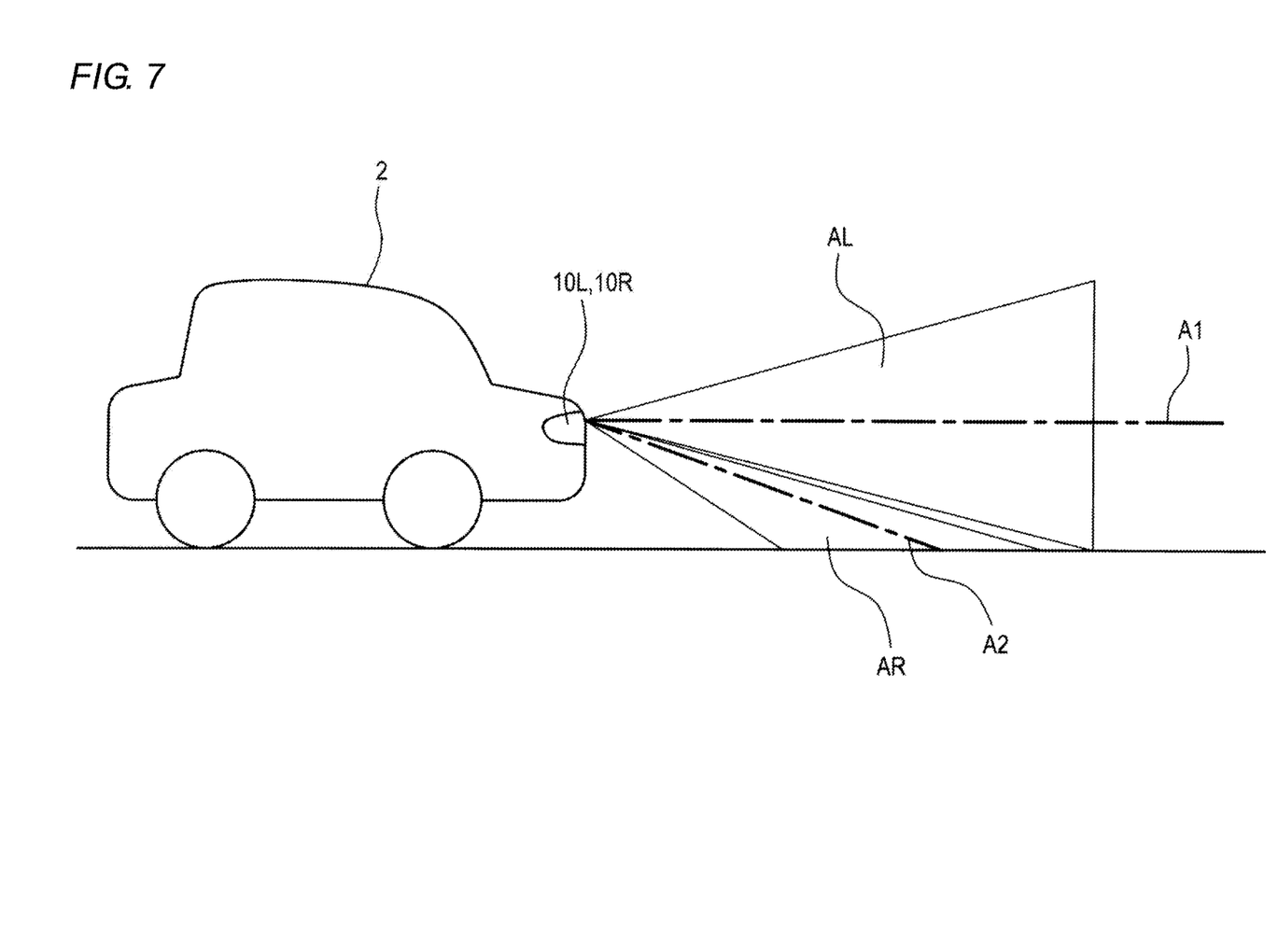
FIG. 7 is a schematic diagram depicting an illuminating area of a left image forming device and an illuminating area of a right image forming device as seen from a side of a vehicle.

FIG. 7 is a schematic diagram depicting how the shining area AL of the left image forming device 10L and the shining area AR of the right image forming device 10R expand towards the areas lying ahead of the lamps as seen from a side of the vehicle 2.

The pedestrian illuminating patterns L1 are formed in an upper area which lies close to the line of sight of the driver so as to support the visibility of the driver (refer to FIG. 4). Because of this, an optical axis A1 of the projection lens 14 of the left image forming device 10L is set so as to be positioned above a horizontal line ahead of the lamp, whereby the shining area AL of the left image forming device 10L is positioned the upper area, allowing the pedestrian illuminating patterns L1 to be formed in the upper area.

On the other hand, with the lane forming patterns L2, the driving lane of the subject vehicle is drawn or defined on the road surface (refer to FIG. 4). Because of this, an optical axis A2 of a projection lens 14 of the right image forming device 10R is set so as to be positioned below the horizontal line ahead of the lamp, whereby the shining area AR of the right image forming device 10R is positioned below the shining area AL of the left image forming device 10L, and the right image forming device 10R shines light onto a road surface lying near the vehicle.

<Advantages>

According to the vehicle lighting system 1 of this embodiment, the shining area AL of the left image forming device 10L and the shining area AR of the right image forming device 10R differ from each other.

A case is considered which differs from the embodiment and in which an optical image formed by a left image forming device and an optical image formed by a right image forming device are superposed on each other to form pedestrian illuminating patterns. In this case, a change in a relative position between the left image forming device and pedestrians and a change in a relative position between the right image forming device and the pedestrians differ from each other when the vehicle turns. Because of this, the ECU is required to execute exclusively an arithmetic operation so as to allow the optical image formed by the left image forming device and the optical image formed by the right image forming device to change independently of each other to cause both the optical images to match ahead of the lamps. To make this happen, the ECU is subjected to high load. In addition, it is required to register strictly an optical axis of the left image forming device with an optical axis of the right image forming device.

In particular, in the case with the embodiment in which the image forming devices are used which can form an arbitrary optical image by changing arbitrary elements of the plurality of elements, the light distribution patterns of complex shapes can formed ahead of the lamps. However, in the event that a light distribution pattern of a complex shape is attempted to be formed by superposing the optical images of the left and right image forming devices on each other, it is difficult to cause the optical images formed by the left and right image forming devices to correspond in position with each other.

In contrast with this, according to the vehicle lighting system 1 of the embodiment of the present invention, even when the vehicle turns, the ECU 3 only has to control the pedestrian illuminating patterns L1 formed by the left image forming device 10L, and hence, no excessive load is exerted on the ECU 3. Namely, the optical images (the pedestrian illuminating patterns L1 and the lane forming patterns L2) which are formed by the left and right image forming devices 10L, 10R do not have to be superposed on each other, and therefore, the optical images L1, L2 can be formed easily and accurately.

In addition, the pedestrian illuminating patterns L1 formed by the left image forming device 10L and the lane forming patterns L2 formed by the right image forming device 10R are applied differently. Namely, the left image forming device 10L forms the pedestrian illuminating patterns L1 for the driver to find pedestrians easily, while the right image forming device 10R forms the lane forming patterns L2 for drawing or defining the driving lane of the subject vehicle to support the driver in driving. Thus, the image forming devices 10L, 10R are not required to cause the optical images L1, L2 they form to correspond in position to each other.

Modified Examples

The vehicle lighting system of the present invention is not limited to the embodiment that has been described heretofore and can be modified or improved as required.

For example, in the embodiment, the left image forming device 10L is described as forming the pedestrian illuminating patterns L1 and the right image forming device 10R is described as forming the lane forming patterns L2. However, the present invention is not limited thereto. For example, a configuration may be adopted in which the left image forming device 10L forms the lane forming patterns, while the right image forming device 10R forms the pedestrian illuminating patterns.

Additionally, the light distribution patterns formed by the image forming devices are not limited to the pedestrian illuminating patterns for illuminating pedestrians and the lane forming patterns for drawing or defining the driving lane of the subject vehicle.

Figure 8:
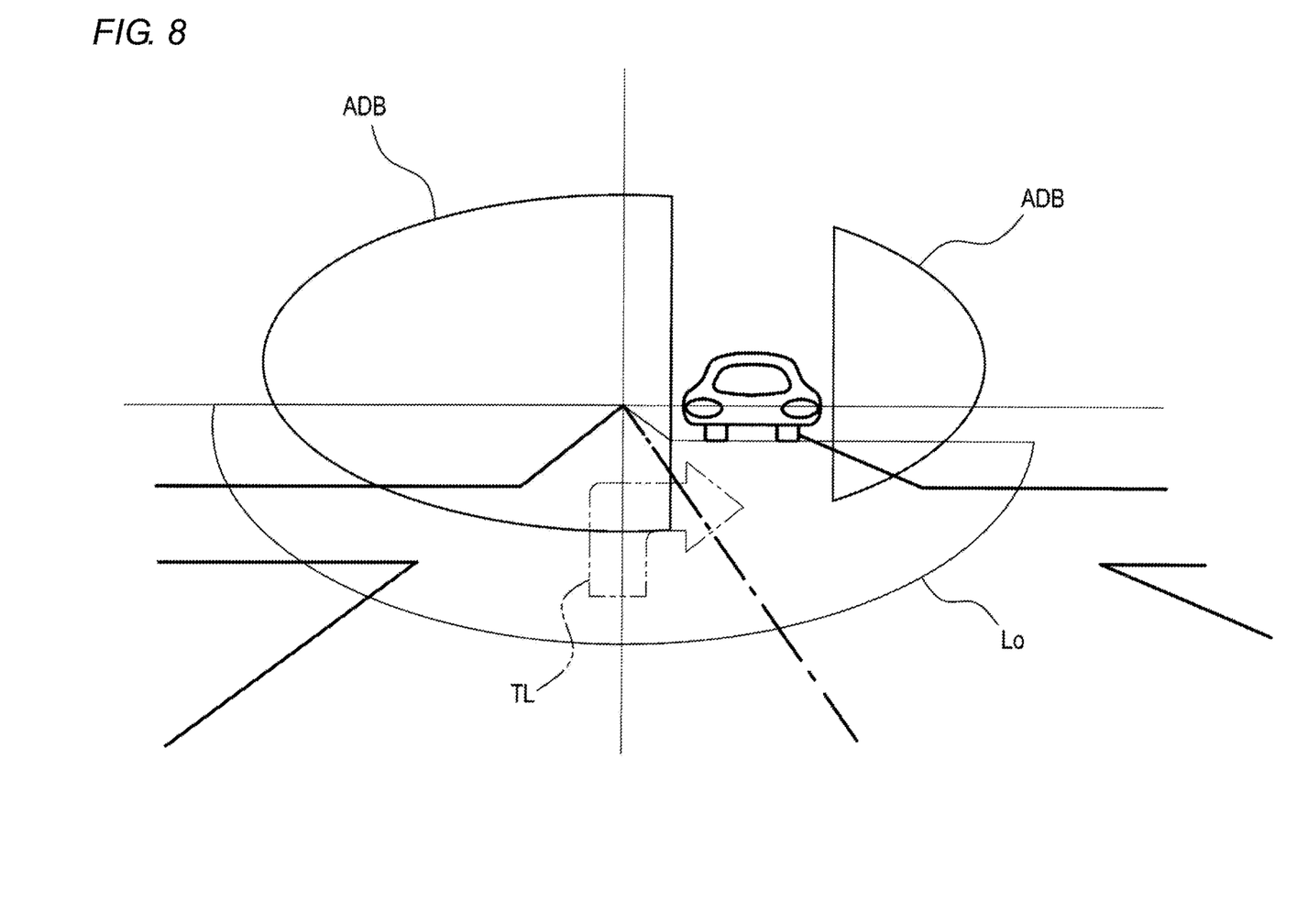
FIG. 8 is a diagram corresponding to FIG. 4 depicting a vehicle lighting system according to a modified example.

FIG. 8 is a diagram corresponding to FIG. 4, which shows a vehicle lighting system according to a modified example. For example, as shown in FIG. 8, a vehicle lighting system 1 may be configured so as to form an ADB light distribution pattern ADB and a direction indicating light distribution pattern TL. A left image forming device 10L forms the ADB light distribution pattern ADB, and a right image forming device 10R forms the direction indicating light distribution pattern TL.

The ADB (Adaptive Driving Beam) light distribution pattern ADB means a light distribution pattern in which light is not projected only to areas in a high beam light distribution pattern where a preceding vehicle and an oncoming vehicle exist, and in this light distribution pattern, the areas to which light is cut off change according to the presence of a preceding vehicle and an oncoming vehicle and the positions thereof if any. With the ADB light distribution pattern ADB, the visibility of the driver can be enhanced without dazzling the driver of a preceding vehicle and the driver of an oncoming vehicle.

The direction indicating light distribution pattern TL means a light distribution pattern for indicating the traveling direction of the vehicle by drawing or projecting an arrow on a road surface. By using the direction indicating light distribution pattern TL together with a direction indicator, it is possible to let those within the surrounding environment of the vehicle know about the traveling direction of the subject vehicle.

In addition to these modified examples described heretofore, the image forming devices may be used to display a map of a navigation system on a road surface, to display an instrument panel such as a speedometer on a road surface, to form an OHS light distribution pattern for illuminating a sign placed above a road surface (Over Head Sign) or to display a motion picture or the like. In addition to these, the image forming devices may be caused to function as a part of an infrared sensor for shining an infrared ray.

Incidentally, in a space above the horizon, a wide range is illuminated to enhance the visibility of the driver as by the pedestrian illuminating patterns L1, the ADB light distribution pattern ADB and the OHS light distribution pattern on many occasions. In contrast with this, in a space below the horizon, a complex pattern is drawn in a specific area as when drawing the lane forming patterns L2 for drawing or defining the driving lane of the subject vehicle, the map or the speedometer on many occasions.

In this way, different characteristics are required on the light distribution patterns which are formed in the different positions in relation to an up-to-down direction on many occasions. Because of this, as in the vehicle lighting system 1 according to the embodiment described above, it is preferable that the shining area AL of the left image forming device 10L is positioned above the shining area AR of the right image forming device 10R. In addition, it is preferable that the light shining area AL which is positioned upper is formed wider than the shining area AR positioned lower.

Although the vehicle lighting system is described as including the two image forming devices, the vehicle lighting system may include three or more image forming devices.

In the embodiment described above, the liquid crystal elements are described as being used for the image forming devices. However, the present invention is not limited thereto. A DMD (Digital Mirror Device) or a scanning type image forming device employing a galvanometer mirror may be used for the image forming devices.

The DMD is a device including a plurality of reflecting surfaces whose orientations can be changed independently. This DMD can be used in place of the image forming module 13 of the embodiment. A state in which the reflecting surfaces of the DMD are oriented in a specific direction so that light is emitted from the reflecting surfaces towards the front of the lamp is referred to as an ON state, and a state in which the reflecting surfaces are oriented in any other directions than the specific direction so that no light is emitted from the reflecting surfaces towards the front of the lamp is referred to as an OFF state. Then, an optical image of an arbitrary shape can be formed by controlling the individual reflecting surfaces to be put in the ON state and the OFF state. Namely, images which the individual reflecting surfaces of the DMD project correspond to individual elements which make up a shining area of the image forming device.

In the scanning type image forming device employing the galvanometer mirror, light from a light source with a high directivity is reflected by the rotatable galvanometer mirror. By reflecting the light by the galvanometer mirror which is being rotated, the reflected light is scanned in a specific direction. By shining the light ahead of the lamp while shifting sequentially scanning lines, a light distribution pattern of an arbitrary shape can be formed ahead of the lamp. The individual scanning lines which extend in specific directions correspond to elements which make up the shining area of the image forming device.

The numeric values shown as the specifications in the embodiment and its modified examples represent only one example, and hence, these numeric values may, of course, be set as different values as required.

The present invention is not limited to the embodiment and its modified examples, and hence, configurations to which other various modifications than those described above are made can be adopted.

While the present invention has been described in detail and by reference to the specific embodiment, it is obvious to those skilled in the art to which the present invention pertains that various alterations and/or modifications can be made thereto without departing from the spirit and scope of the present invention.

This patent application is based on Japanese Patent Application (Application No. 2013-182444) filed on Sep. 3, 2013, the contents of which are incorporated herein by reference.

DESCRIPTION OF REFERENCE NUMERALS AND CHARACTERS

1: vehicle lighting system; 2: vehicle; 3: ECU; 41: housing; 42: outer lens; S: lamp compartment; LL: left lamp; RL: right lamp; 10L: left image forming device; 10R: right image forming device; 11: light source; 12: reflector; 13: image forming module; 14: projection lens; 51: glass plate; 52: liquid crystal element; 53: frame; 54: image forming plane; 20L: left low beam shining lamp; 20R: right low beam shining lamp; 21: light source; 22: reflector; 23: shade; 24: projection lens; 30L: left high beam shining lamp; 30R: right high beam shining lamp; 31: light source; 32: reflector; 33 projection lens; Hi: high beam light distribution pattern; Lo: low beam light distribution pattern; L1: pedestrian illuminating pattern; L2: lane forming pattern; AL, AR: shining area; e: element.

The invention claimed is:

1. A vehicle lighting system comprising:
at least a pair of two-dimensional image forming devices whose shining areas are each divided into a plurality of elements and which are respectively configured to form an optical image of an arbitrary shape by changing the elements arbitrarily,
wherein the shining area of at least one of the two-dimensional image forming devices differs from the shining area of the other of the two-dimensional image forming areas,
wherein the shining area of the one two-dimensional image forming device is positioned above the shining area of the other two-dimensional image forming device,
wherein the shining area of the one two-dimensional image forming device is wider than the shining area of the other two-dimensional image forming device,
wherein the other two-dimensional image forming device has an optical axis which is set so as to be positioned below the horizontal line,
wherein the optical image formed by the one two-dimensional image forming device is used for an application different from an application of the optical image formed by the other two-dimensional image forming device, and
wherein the one two-dimensional image forming device is configured to form a pedestrian illuminating pattern for illuminating a pedestrian, an Adaptive Driving Beam (ADB) distribution pattern or an Over Head Sign (OHS) light distribution pattern for illuminating a sign placed above the road surface, and the other two-dimensional image forming device is configured to draw a light distribution pattern on a road surface.

2. The vehicle lighting system according to claim 1, wherein
the pair of two-dimensional image forming devices are provided individually at a left-hand side and a right-hand side of a vehicle.

3. The vehicle lighting system according to claim 1,
wherein the other two-dimensional image forming device is configured to form a lane forming pattern for illuminating a driving lane on the road surface or form a direction indicating light distribution pattern for indicating a traveling direction of a vehicle on the road surface.

4. The vehicle lighting system according to claim 1, further comprising:
left and right vehicle lamps each having therein a low beam lamp and a high beam lamp,
wherein the two-dimensional image forming devices are disposed in the left and right vehicle lamps, respectively.

5. The vehicle lighting system according to claim 1, wherein
the two-dimensional image forming devices each comprises independently controllable liquid crystal elements arranged in a matrix configuration.

* * * * *